(12) United States Patent
Moriya

(10) Patent No.: US 7,552,154 B2
(45) Date of Patent: Jun. 23, 2009

(54) SYSTEM AND METHOD FOR STATISTICALLY SEPARATING AND CHARACTERIZING NOISE WHICH IS ADDED TO A SIGNAL OF A MACHINE OR A SYSTEM

(76) Inventor: Netzer Moriya, 6 Yair Street, Ramat Hasharon (IL) 47224

( * ) Notice: Subject to any disclaimer, the term of this patent is extended or adjusted under 35 U.S.C. 154(b) by 700 days.

(21) Appl. No.: 11/109,061

(22) Filed: Apr. 18, 2005

(65) Prior Publication Data

US 2006/0179089 A1 Aug. 10, 2006

(30) Foreign Application Priority Data

Feb. 10, 2005 (IL) .................................... 166837

(51) Int. Cl.
*G06F 15/00* (2006.01)
(52) U.S. Cl. ..................................................... 708/200
(58) Field of Classification Search .................. 708/200
See application file for complete search history.

(56) References Cited

U.S. PATENT DOCUMENTS

| 6,658,261 | B1 | 12/2003 | Winters et al. |
| 6,697,492 | B1 | 2/2004 | Yamaguchi et al. |
| 6,718,259 | B1 | 4/2004 | Khosla |
| 6,740,518 | B1 | 5/2004 | Duong et al. |
| 6,744,893 | B1 * | 6/2004 | Fleming-Dahl ............. 380/263 |
| 6,754,293 | B1 | 6/2004 | Henriksson et al. |
| 6,829,534 | B2 | 12/2004 | Fuchs et al. |
| 6,836,679 | B2 | 12/2004 | Baker, Jr. et al. |
| 2002/0055913 | A1 * | 5/2002 | Rajan .......................... 706/19 |

OTHER PUBLICATIONS

Gelb, A., Applied Optimal Estimation, The MIT Press, Cambridge, MA 1974 Chapter 1, pp. 1-7.
Jazwinski, A.H., Stochastic Processes and Filtering Theory, Academic Press, New York, 1970, chapters 1 and 2, pp. 1-13.
R. Chandramouli et al., Computing the Bivariate Gaussian Probability Integral; IEEE Signal Processing Letters; vol. 6, No. 6, Jun. 1999.

(Continued)

*Primary Examiner*—Chuong D Ngo
(74) *Attorney, Agent, or Firm*—Dorsey & Whitney LLP

(57) ABSTRACT

Method for finding the probability density function type and the variance properties of the noise component N of a raw signal S of a machine or a system, said raw signal S being combined of a pure signal component P and said noise component N, the method comprising: (a) defining a window within said raw signal; (b) recording the raw signal S; (c) numerically differentiating the raw signal S within the range of said window at least a number of times m to obtain an m order differentiated signal; (d) finding a histogram that best fits the m order differentiated signal; (e) finding a probability density function type that fits the distribution of the histogram; (f) determining the variance of the histogram, said histogram variance being essentially the m order variance $\sigma^2_{(m)}$ of the noise component N; and (g) knowing the histogram distribution type, and the m order variance $\sigma^2_{(m)}$ of the histogram, transforming the m order variance $\sigma^2_{(m)}$ to the zero order variance $\sigma^2_{(0)}$, said $\sigma^2_{(0)}$ being the variance of the pdf of the noise component N, and wherein the histogram type as found in step (e) being the probability density function type of the noise component N.

14 Claims, 8 Drawing Sheets

OTHER PUBLICATIONS

Aiazzi, Bruno, "Estimation Based on Entropy Matching for Generalized Gaussian PDF Modeling," IEEE Signal Processing Letters, vol. 6, No. 6, Jun. 1999, pp. 138-140.

Di Nunno, G., "On Stochastic Derivative," Pure Mathematics, No. 12, May 2001, pp. 1-13.

Elachi, Charles, "Spaceborne Imaging Radar: Geologic and Oceanographic Applications," Science, vol. 209, Sep. 5, 1980, pp. 1073-1082.

Faruqi, Farhan A., "Extended Kalman filter synthesis for integrated global positioning/inertial navigation systems," Applied Mathematics and Computation, 115, 2000, pp. 213-227.

Grewal, Mohinder S. and Andrews, Angus P., "Kalman Filtering: Theory and Practice Using Matlab," Prentice Hall, 1993.

Heald, J.P.M. and Stark, J., "Estimation of Noise Levels for Models of Chaotic Dynamical Systems," Physical Review Letters, vol. 84, No. 11, Mar. 13, 2000, pp. 2366-2369.

Kleinert, Hagen and Shabanov, Sergei V., "Supersymmetry in stochastic processes with higher-order time derivatives," Physics Letters, A, 235, 1997, pp. 105-112.

Kay, Steven, "Model-Based Probability Density Function Estimation," IEEE Signal Processing Letters, vol. 5, No. 12, Dec. 1998, pp. 318, 320.

Tribelsky, Michael I., "General Exact Solution to the Problem of the Probability Density for Sums of Random Variables," Physical Review Letters, vol. 89, No. 7, Aug. 12, 2002, pp. 070201-1-070201-4.

Kontorovich, Valerii, Lyandres, Vladimir, and Primak, Sergey, "The Generation of Diffusion Markovian Processes with Probability Density Function Defined on Part of the Real Axis," IEEE Signal Processing Letters, vol. 3, No. 1, Jan. 1, 1996, pp. 19-21.

Wiener, Norbert, "Differential-Space," Journal of Mathematical and Physical Sciences, 2, 1932, pp. 131-173.

Karkuszewski, Zbyszek P., Jarzynski, Christopher and Wojciech, Zurek H., "Quantum Chaotic Environments, the Butterfly Effect, and Decoherence," Physical Review Letters, vol. 89, No. 17, Oct. 21, 2002, pp. 170405-1-170405-4.

Dorogovtsev, A.A., "Stochastic Analysis and Random Maps in Hilbert Space," VSP, Urtrecht, The Netherlands, 1994.

* cited by examiner

SYSTEM AND METHOD FOR STATISTICALLY SEPARATING AND CHARACTERIZING NOISE WHICH IS ADDED TO A SIGNAL OF A MACHINE OR A SYSTEM

FIELD OF THE INVENTION

The present invention relates to the field of estimating and characterizing noise which is added to a signal of a machine or a system. More particularly, the invention relates to a method and system for estimating and characterizing the component of the added noise of a signal. The method of the invention enables the finding of both the statistical nature and the type of the probability distribution or density functions of the noise component as well as its variance.

BACKGROUND OF THE INVENTION

The importance of the knowledge of the fundamental properties of stochastic systems and processes has been recently acknowledged by a growing portion of the scientific and engineering community. Among other properties of stochastic processes, the nature of the noise component which contaminates the pure signal of the system is of major importance. The term "noisy signal" or "raw signal" whenever referred to in this application, refers to a signal which comprises a noise component and a pure signal which are inseparable. Throughout this application, the term "noise" refers to any random or unknown component whose exact behavior cannot be exactly predicted, but knowing its probability density function is highly valuable. Also, the term "variance" relates to the second moment of the probability density function and is used as is common in the art of Statistics and Probability theories. Moreover, throughout this application the terms "machine", "system" and "process" are used interchangeably with respect to the method of the invention. An accurate estimation of the noise properties can provide to the system designer very important tools for improving the system behavior. An accurate determination of the noise properties is particularly important for dynamical systems where non-linear behavior is expected and in which the noise may seriously alter any estimation of the states of the system, if not to cause a total divergence of the parameters of the system model. Such conditions are particularly common in non-linear systems when modeled by recursive or adaptive methods such as Weiner or Kalman filtering. The principles and theory of Kalman and Weiner filtering are described, for example, in Gelb, A., "Applied Optimal Estimation", Chapter 1, pp. 1-7, The MIT Press, Cambridge, Mass., 1974.

The following United States patents are believed to represent the state of the art for Signal estimation, noise characteristics, and Kalman and adaptive filtering in applicable systems: U.S. Pat. Nos. 6,829,534; 6,740,518; 6,718,259; 6,658,261; 6,836,679; 6,754,293; and 6,697,492.

The theory of non-linear filtering and its applications are discussed in:
(a) Grewal, M. S. et al., Kalman Filtering, Prentice-Hall, 1993;
(b) Jazwinski, A. H., Stochastic Processes and Filtering Theory, Academic Press, New York, 1970, chapters 1 and 2, pp. 1-13;
(c) Gelb, A., Applied Optimal Estimation, The MIT Press, Cambridge, Mass., 1974 Chapter 1, pp. 1-7; and
(d) Wiener, N., Journal of Mathematical and Physical Sciences 2, 132 (1923).

The art of signal processing, probability and stochastic processes and noise characteristics are also discussed in:
(a) Bruno Aiazzi et al., IEEE Signal Processing Lett. 6 138 (1999);
(b) R. Chandramouli et al., "Probability, Random Variables and Stochastic Processes", A. Papoulis, McGraw-Hill USA, (1965);
(c) IEEE Signal Processing Lett. 6 129;
(d) Zbyszek P. Karkuszewski, Christopher Jarzynski, and Wojciech H. Zurek, Phys Rev. Lett. 89, 170405 (2002);
(e) A. F. Faruqi and K. J. Turner Applied Mathematics and Computation, 115, 213 (2000);
(f) J. P. M. Heald and J. Stark, Phys. Rev. Lett. 84, 2366 (2000);
(g) A. A. Dorogovtsev, Stochastic Analysis and Random Maps in Hilbert Space, VSP Publishing, The Netherlands, (1994) (in particular see the consideration for high-order stochastic derivative in chap. 1);
(h) H. Kleinert and S. V. Shabanov, Phys. Lett. A, 235, 105, (1997);
(i) Elachi, C., Science, 209, 1073-1082, (1980);
(j) Valeri Kontorovich et al., IEEE Signal Processing Lett. 3, 19 (1996);
(k) Steve Kay., IEEE Signal Processing Lett. 5, 318 (1998);
(l) Michael I. Tribelsky, Phys. Rev. Lett. 89, 070201 (2002).

The theory of curve fitting, differentiation and high order derivatives is discussed in:
(a) G. Di Nunno, Pure Mathematics 12, 1, (2001); and
(b) K. Weierstrass, Mathematische Werke, Bd. III, Berlin 1903, pp. 1-17.

It is an object of the present invention to provide a method for the statistical separation and determination of the noise properties from the noisy signal.

It is another object of the invention to provide such a method that can be performed in real-time.

It is still another object of the present invention to provide such a method for characterizing the noise which is adaptive.

It is still another object of the present invention to provide said method for characterizing the noise that can determine not only the variance of the noisy signal, but also the type of the probability density function (pdf) of the noise component.

It is still another object of the present invention to provide said method for characterizing the noise that does not depend on a priori knowledge of the structure of the pure signal.

It is still another object of the present invention to provide said method for characterizing the noise that does not depend on the structure of the pure signal.

It is still another object of the present invention to provide said method for characterizing the noise that involves defining a window of the analyzed signal, and given said window, the method does not depend on any accumulative information outside said window boundaries.

Other objects and advantages of the present invention will become apparent as the description proceeds.

SUMMARY OF THE INVENTION

The present invention refers to a method for finding the probability density function and the variance properties of the noise component N of a raw signal S of a machine or a system, said raw signal S being combined of a pure signal component P and said noise component N, the method comprising the steps of: (a) defining a window within said raw signal; (b) recording the raw signal S; (c) numerically differentiating the raw signal S within the range of said window at least a number of times m to obtain an m order differentiated signal; (d) finding a histogram that best fits the m order differentiated signal; (e) finding a probability density function type that fits the distribution of the histogram; (f) determining the variance (or any equivalent parameter, depending on the specific said pdf type) of the histogram, said histogram variance being essentially the m order variance $\sigma^2_{(m)}$ of the noise component N; and (g) knowing the histogram distribution type, and the m order variance $\sigma^2_{(m)}$ of the histogram, transforming the m order variance $\sigma^2_{(m)}$ to the zero order variance $\sigma^2_{(0)}$, said $\sigma^2_{(0)}$ being the variance of the pdf of the noise component N, and wherein the histogram type as found in step (e) being the probability density function type of the noise component N.

Preferably, the method is repeatedly performed as the raw signal S progresses.

Preferably, the method is performed in real-time.

Preferably, the probability density function type that fits the distribution of the histogram is the one from a list that found to be best fitting the distribution of the histogram.

Preferably, the list comprises only one probability density function type.

Preferably, the one probability density function type is the Gaussian type.

Preferably, the transformation is performed by means of a specific expression suitable for the said fitted probability density function, wherein said specific expression is derived from the following general expression $$F^{(m)}_{n_i} = \int_{D_2} \int \left\{ \prod_{j=1}^{m} S^m_j f(\xi) \right\} d\xi^{(m)}$$

Preferably, when the fitted probability distribution function is Gaussian, the transform is performed by means of the following specific expression $$\frac{d^m N(0, \sigma^2_0)}{d i^m} = \alpha(m) N(0, \beta(m)\sigma^2_0)$$

The present invention also relates to an apparatus for determining the probability density function type and the variance properties of the noise component N of a raw signal S of a machine or a system, said raw signal S being combined of a pure signal component P and said noise component N, the system comprises: (a) differentiating module, for receiving and numerically differentiating the raw signal S within the range of a predefined window at least a number of times m to obtain an m order differentiated signal; (b) a module for finding a histogram that best fits the m order differentiated signal; (c) a list containing at least one type of predefined probability density function; (d) a module for finding one probability density function type from said list that best fits the distribution of the histogram; (e) a module for determining the variance of the histogram, said histogram variance being essentially the m order variance $\sigma^2_{(m)}$ of the noise component N; and (f) a module for, given the histogram distribution type and the m order variance $\sigma_{(m)}$ of the histogram, transforming the m order variance $\sigma^2_{(m)}$ to the zero order variance $\sigma^2_{(0)}$, said $\sigma^2_{(0)}$ being the variance of the pdf of the noise component N, wherein the histogram type as found in step (d) being the probability density function type of the noise component N.

Preferably, the apparatus components operate repeatedly to find the updated probability density function type and the variance properties of the noise component as the signal S progresses.

The present invention also relates to a system for receiving a raw signal S which is combined from a pure signal P and a noise component N, and for outputting a signal which is essentially said pure signal, wherein the system comprises: (a) apparatus as described above for receiving said raw signal and outputting the probability density function and distribution type of said noise component into a filter; and (b) a filter receiving said raw signal and also receiving said probability density function and distribution type of said noise component from said apparatus, and given said received data, processing and outputting a signal which is essentially said pure signal.

Preferably, the filter is an adaptive filter.

Preferably, the filter is a Kalman Filter.

Preferably, the system of the invention as described above operates continuously in real time.

DETAILED DESCRIPTION

As said, the knowledge of the properties of the expected noise component provides to the system designer a very significant tool for improving the system structure and behavior. The essence of this invention is to perform relatively simple numerical calculations on the noisy signal in order to derive both the type of the probability density function of the noise and the properties of said of the probability density function and in particular the variance of said function.

Figure 1:
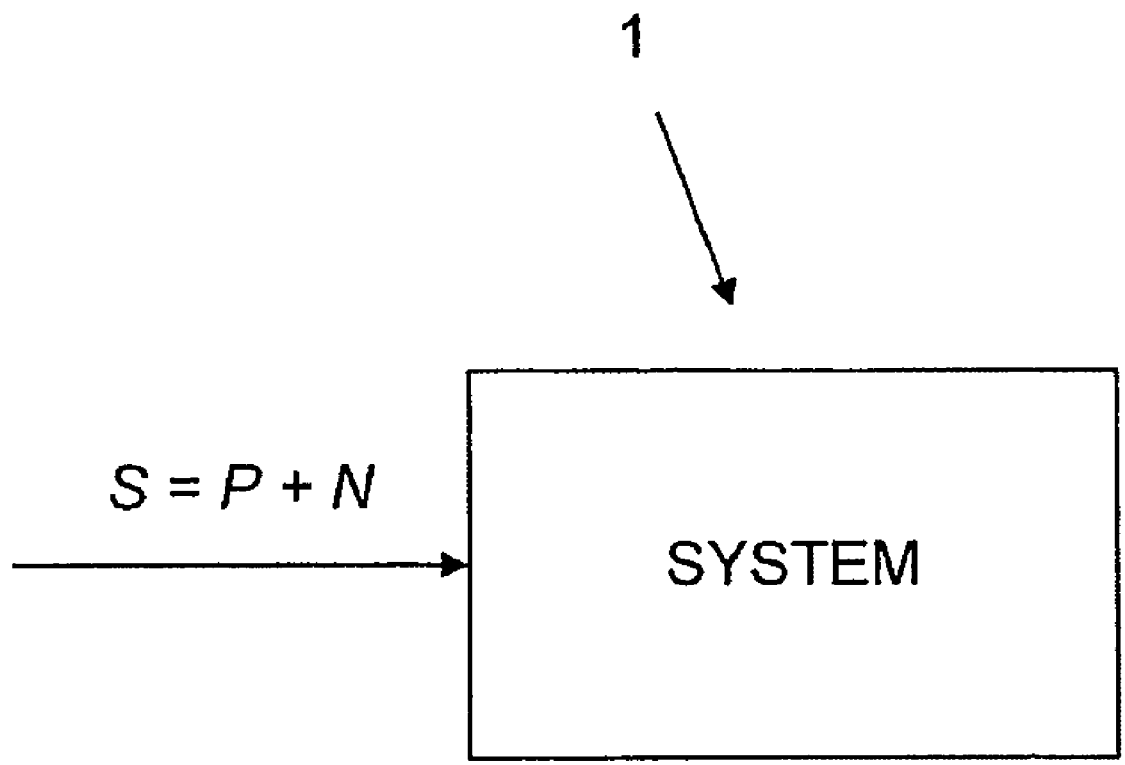
FIG. 1 shows a general system according to the prior art.

FIG. 1 shows a typical system. A raw signal S which is combined of a pure signal P and an additive noise N component is provided to the system. Throughout this application, it should be noted that the invention relates to the characterizing of the noise which is added not only to an input signal, but may also relate to a noise that is added to a signal within the system. The present invention can provide the properties of the noise component N, given said signal S.

Figure 9:
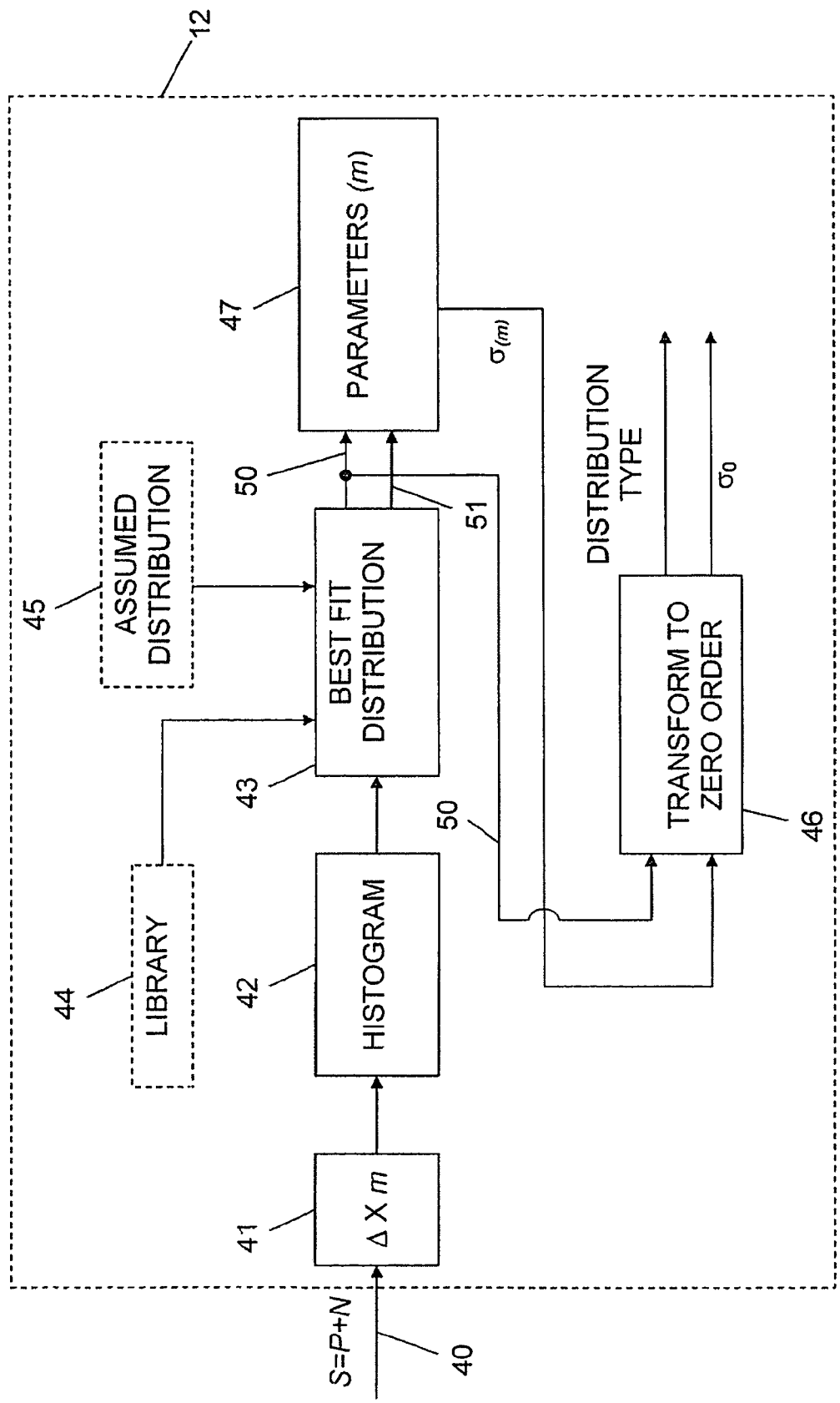
FIG. 9 illustrates an apparatus for performing a method according to one embodiment of the invention.

The method of the present invention comprises of the following steps:

1. Defining a portion of the raw signal that may dynamically progress according to the development of the signal, hereinafter defined as the "window", or the "analysis window", provided that the number of elements in said window is statistically sufficient;
2. Recording the noisy signal S which is combined of a pure signal portion P and of a noise component N;
3. Numerically differentiating the raw signal at least a number of times m to obtain an m times differentiated signal;
4. Finding the histogram of the differentiated signal;
5. Providing a list of optional probability density functions, and from said list finding the one probability density function that is best fitted to the histogram distribution;
6. Determining from the best fitted probability density function the parameters that characterize that function, said function being the probability density function of the m order differentiated raw signal S, but essentially being a close approximation to the m order differentiated probability density function of the noise component N. The arguments for supporting this assumption are given hereinafter;
7. Transforming the parameters of the fitted, m order differentiated probability density function to extract the parameters of the zero order probability density function of the noise component N of signal S. The transformation is performed using an expression which is suitable for the fitted probability density function type (as will be elaborated later, expressions (3) and (4) which are given below are general expressions that are suitable for any type of probability density function, while the simplified expression (5) is suitable for Gaussian probability density function);

FIG. 9 shows an apparatus for performing a method according to one embodiment of the invention. In particular, FIG. 9 shows a Noise Estimation Unit 12 and provides a block diagram illustrating the method. A noisy, raw signal S=P+N which is combined of a pure component P and a noise component N is provided over line 40 (step 2 above) to a Noise Estimation Unit 12. The signal S is differentiated m times by the differentiation block 41 (step 3 above). Then, block 42 draws a histogram for the (m) times differentiated signal as provided by block 41 (step 4 above). Block 43 receives the histogram from block 42, and finds a probability density function type that best fits the distribution of the histogram (step 5 above). For that purpose, block 43 may use the library 44 containing several probability density function types to find the one probability density function that best fits the histogram, or alternatively it may apply an assumed probability density function from block 45 (for example, a Gaussian distribution) (also step 5 above). After finding the probability density function that best fits the histogram, block 47 which receives the probability density function type over line 50, and the histogram over line 51 determines the (m) order variance $\sigma^2_{(m)}$ of the histogram (step 6). The (m) order variance, as well as the probability density function type are provided into the transformation block 46, which in turn uses this data (pdf) type and $\sigma^2_{(m)}$ in order to find the zero order variance $\sigma^2_{(0)}$ while the pdf type remains the same as for the m order pdf (step 7). Block 46 then outputs both the zero order probability density function type and the variance $\sigma^2_{(0)}$ of the noise to any system that may use these valuable parameters of the noise.

Now, the present invention will be described by means of an example. FIGS. 2 to 5 demonstrate the method of the present invention.

EXAMPLE

Figure 2:
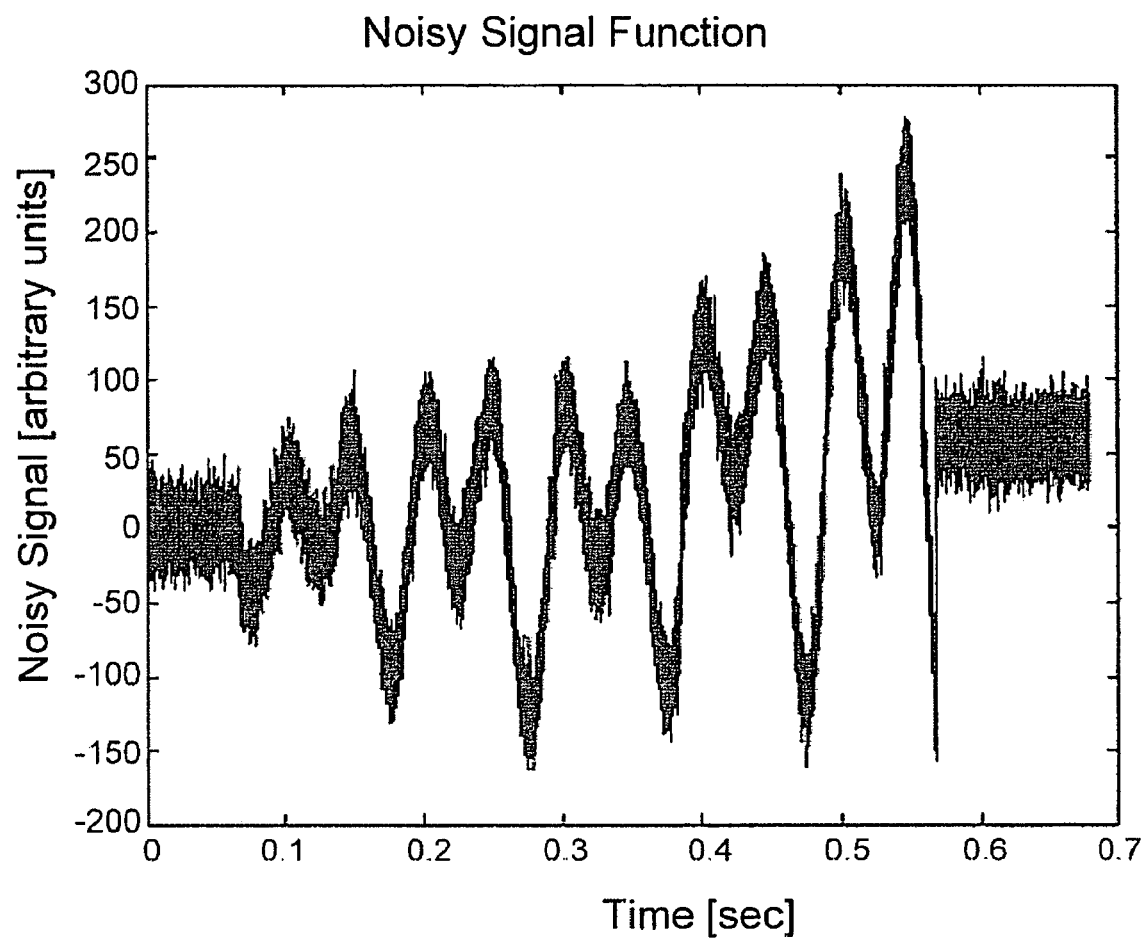
FIG. 2 illustrates a simulated raw signal S that contains a pure component P and a noise component N.
Figure 3:
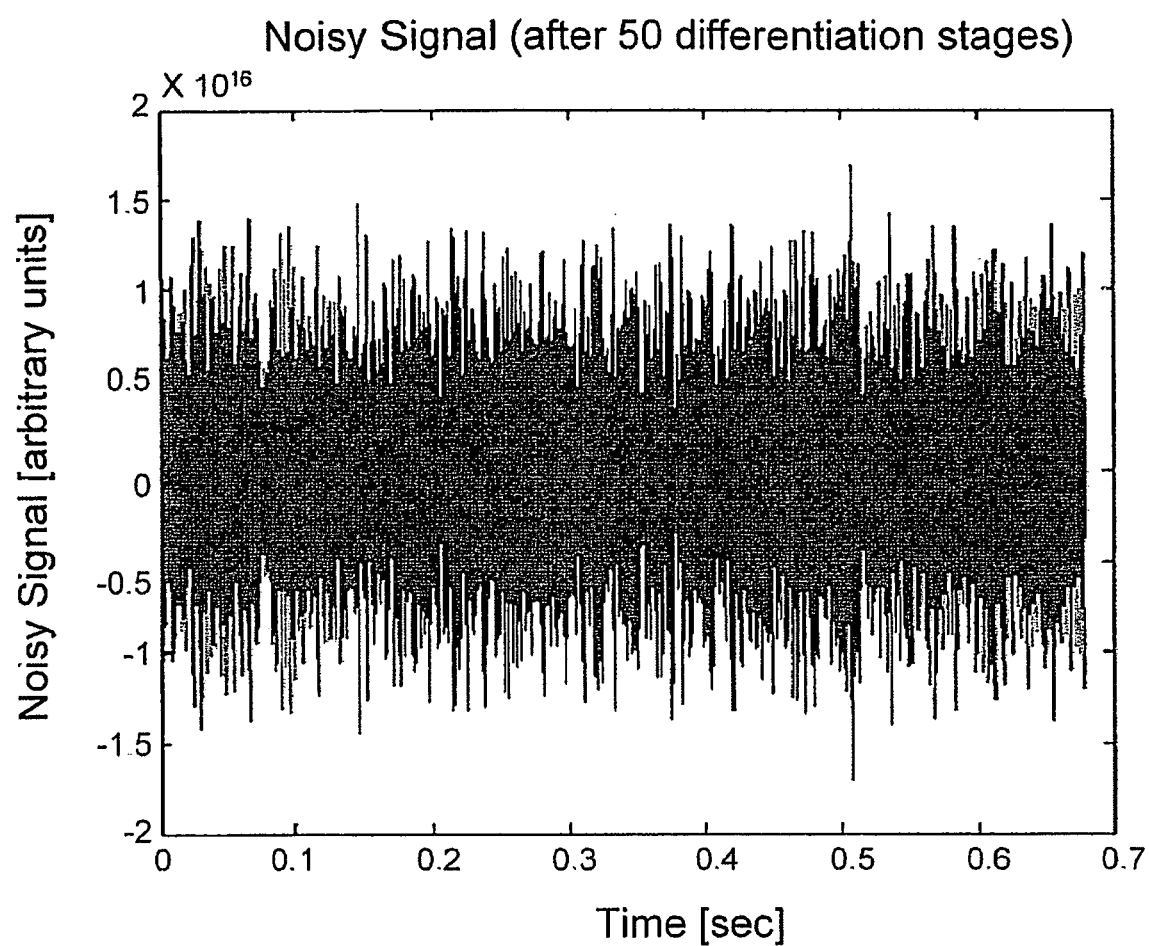
FIG. 3 shows the 50$^{th}$ differentiation of signal S of FIG. 2.
Figure 4:
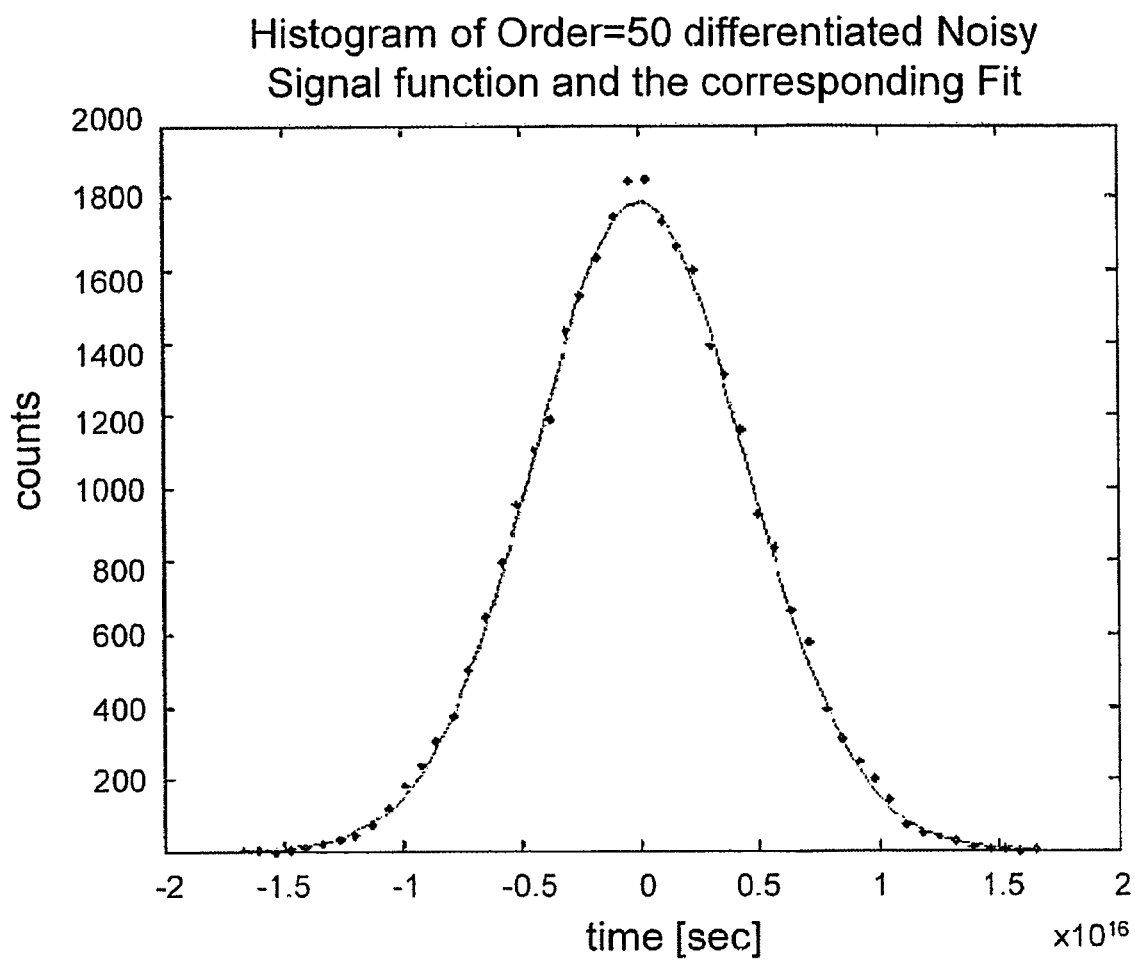
FIG. 4 shows a histogram that was drawn for the 50 times differentiated signal of FIG. 3. The solid line in FIG. 4 represents a Least Mean Square fit of the point of the histogram to a Gaussian Functions from which the Gaussian parameters are extracted.
Figure 5:
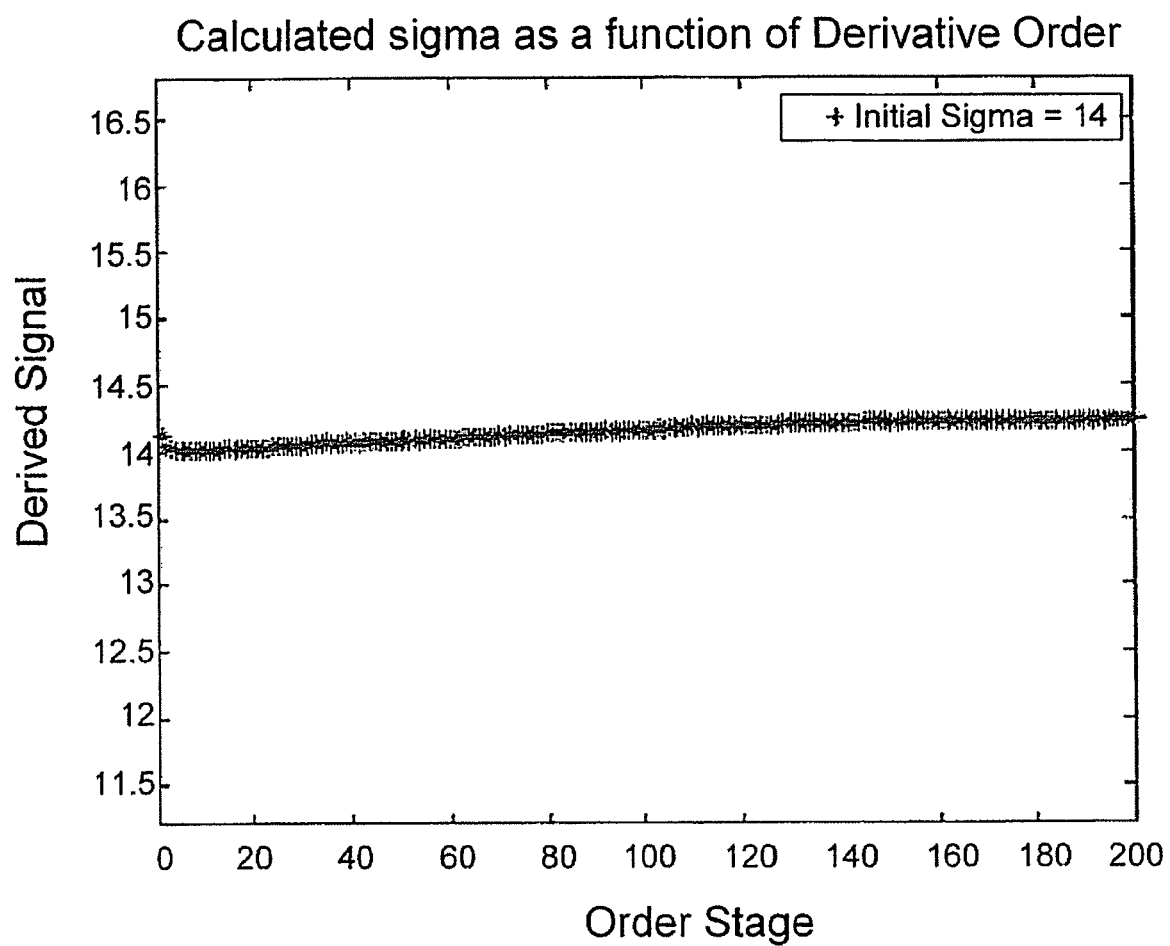
FIG. 5 shows the re-normalized values $\sigma_{(0)}$ as extracted from the corresponding $\sigma_{(m)}$ found for the raw signal of FIG. 2 that was differentiated m=1, 2, 3, . . . , 200 times.

FIG. 2 illustrates a simulated raw signal S that contains a pure component P and a noise component N. The duration of the S signal (i.e., the "window" considered) was of 0.7 s. It should be clear to any one who is skilled in the art that the window's length can be shorter or longer, depending on the specific case considered. It should also be clear to any one who is skilled in the art that the length of the window can be equal to or, preferably, shorter than the length of the signal. The noise component was intentionally selected to have Gaussian probability density function with a $\sigma_{(0)}$=14. The S signal of FIG. 2 was numerically differentiated 200 times (step 3 above). The $50^{th}$ differentiation of signal S is shown in FIG. 3. From the differentiation result of FIG. 3, a histogram was drawn as shown in FIG. 4 (the discrete points form this histogram). A Gaussian function was then fitted (in the Least Means Square sense) to yield the solid line of FIG. 4. Then, the parameters of said $50^{th}$ order differentiation probability density function of FIG. 4 were extracted. More particularly, the $\sigma_{(50)}$ was found to be 4.432413969422223e+015. Next, using and an expression $\sigma_0=f(\sigma_m)$ (i.e., the initial value is a function of the extracted value after the differentiation step) that will be elaborated further hereinafter, $\sigma_{(0)}$ was found to be 13.958. In addition, from the same expression and the various $\sigma_{(m)}$, the value of $\sigma_{(0)}$ was separately extracted. FIG. 5 shows the extracted values of $\sigma_{(0)}$ as found according to the method of the present invention for the raw signal of FIG. 2 that was differentiated m=1, 2, 3, ..., 200 times. It can be seen that $\sigma_{(0)}$ was found to be very close to the intended, initial value of 14 for all said values of m. More particularly, the $\sigma_{(0)}$ of the noise component was found to be very close to the value the intended, initial value of 14 as was pre-selected for the pdf (probability density function) of the noise component N in this simulation. It can also be concluded that m of as low as 4 or 5 may be sufficient to extract the value of $\sigma_{(0)}$ with high accuracy, as the calculated $\sigma_{(0)}$ for all m larger than 5 are extremely close to the original value 14. Therefore, it can also be concluded that in most cases there is no practical need to differentiate to orders higher than 10.

One of the advantages of the invention as described is the fact that the method can be relatively easily performed in real-time, as the amount of data that is necessary for performing the analysis is relatively small, i.e., only to the extent of statistical validity. Moreover, the method requires the use of very limited amount of memory resources, as no historical data of the signal is advantageous. The only information necessary is that contained in the selected window, and the window in most cases can be narrow.

The present invention is applicable to most types of probability density functions. For each type of pdf one can easily derive the suitable expression as is necessary in step 7 above. Therefore, it is preferably recommended to keep in the list of step 5 above at least one type of probability density function, or preferably more, to keep those functions that are most expected for noise probability density functions.

Theoretical Considerations

Considering a stochastic process $\xi(n_i)$, with $n_i$ the collection of stochastic events, in a measurable space (state-space) so that variance values of the stochastic variables considered here are finite, a differentiating operator, operating on a signal vector, may be defined with respect to the index of the signal data points in their sequenced order (or equivalently, treating the signal as a time series vector with a unit time step). By doing this, one may realize that a differentiation procedure, of the first order, is equivalent to numerical subtracting the element $n_i$ from the element $n_{i+1}$, in the stochastic signal. Since in such random set of points each point is totally independent of all other points and correlated to any other data point within the set only by the mutual statistics of the sample space, denoted by $\Omega$ (i.e. all points (i,j) are uncorrelated where i≠j), the equivalence to subtracting the element $n_i$ from the element $n_{i+1}$ in the noise signal would be the equivalent of the subtraction of two independent Random Variables with identical statistical distribution (IID).

In contrast with the case of the first derivative, where one could assume that all individual data points were uncorrelated, higher order derivatives involve correlated expressions that lead, in the general case, to non-trivial expressions for the resultant probability functions.

Considering the above definitions and referring to some arbitrary random variable function $V(n_i,\xi)$, referred here as the original data signal with $\xi$ as the stochastic random variable, one can now derive the second order derivative index series, $V^{(2)}(n_i^{(2)},\xi^{(2)})$, with $\xi^{(2)}$ refers to the (yet) unknown stochastic random variable corresponding to the second-order derivative vector by realizing that $n_i^{(1)}=n_i-n_{i-1}$ and $n_{i+1}^{(1)}=n_{i+1}-n_i$ so that $n_i^{(2)}=n_{i+1}^{(1)}-n_i^{(1)}=n_{i+1}-2n_i+n_{i-1}$. These expressions imply that the probability density function of the second order derivative is the equivalent pdf of the sum of three independent, however non-identical, random variables (InID), all with similar, however not identical, probability density functions. Referring now to the general result that given two independent random variables $\xi_1$ and $\xi_2$ on the space $R^k$, with $\mu$ and $\nu$ their respective distribution functions and $f$ and $g$ denote their respective density functions, than the distribution of the sum $\xi_1+\xi_2$ is the convolution $\mu*\nu$ and the analogue density function of the sum equals the convolution integral denoted by $f*g$.

Using the notation $f_{\xi_1,\xi_2,\xi_3}=f_{\xi_1}*f_{\xi_2}*f_{\xi_3}$ this implies:

$$f_{n_i^{(2)}}=(f_{n_i}*f_{(-2n_i)})*f_{n_i} \qquad (1)$$

Following the above arguments, for higher derivatives, it can now easily be deduced that the m'th derivative of a random variable derived from an arbitrary statistically defined variable can be obtained by noting that the correlation elements that dictate the derivative expressions are given by the matrix (hereinafter: "the Stochastic-Derivative Matrix"):

$$\begin{matrix}
1 \\
1 & -1 \\
1 & -2 & 1 \\
1 & -3 & 3 & -1 \\
1 & -4 & 6 & -4 & 1 \\
1 & -5 & 10 & -10 & 5 & -1 \\
1 & -6 & 15 & -20 & 15 & -6 & 1 \\
1 & -7 & 21 & -35 & 35 & -21 & 7 & -1 \\
1 & -8 & 28 & -56 & 70 & -56 & 28 & -8 & 1 \\
& & & & \ldots
\end{matrix}$$

and are governed by the following expression, denoted here as the Stochastic-Derivative matrix $S_k^m$, and given by $$S_j^{(m)} = (-1)^{j+1}\binom{m}{j}, \text{ where } \binom{m}{j}$$

denote the elements of the binomial coefficients, and the Stochastic-Derivative matrix $S_k^m$, as defined above is in fact a variant of Pascal Triangle.

In terms of a summation of the individual elements needed to account for the probability density function of the m'th order numerical derivative, the summation may be written as:

$$f_m = \sum_{j=1}^{m} S_j^{(m)} f(z) \qquad (2)$$

wherein $f(z)$ represents the probability density function of the original random variable. For instance, for the second derivative this is equivalent to $f_{n_i^{(2)}}=(f_{n_i}*f_{(-2n_i)})*f_{n_i}$. Generalizing the above, for a set of random variables $\xi_1, \xi_2, \ldots \xi_m$ and a function $z=g(\xi_1, \xi_2, \ldots \xi_m)$, one can form a new random variable: $\xi_z=g(\xi_1, \xi_2, \ldots \xi_m)$. In particular, the density and distribution functions of $\xi_z$, in terms of the density and distribution functions of $\xi_1, \xi_2, \ldots \xi_m$ can easily be obtained. To do so one denotes $D_z=\{(\xi_1, \xi_2, \ldots \xi_m): g(\xi_1, \xi_2, \ldots \xi_m) \leq z\}$ noting that $(\xi_z \leq z)=\{g(\xi_1, \xi_2, \ldots \xi_m) \leq z\}=\{(\xi_1, \xi_2, \ldots \xi_m) \in D_z\}$ so that:

$$F_z(z)=P(Z \leq z)=P((\xi_1, \xi_2, \ldots \xi_m) \in D_z)$$

which gives:

$$F_Z(z) = \int_{D_2}\int f_{\xi_1 \xi_2 \ldots \xi_m}(\xi_1 \xi_2 \ldots \xi_m) d\xi_1 d\xi_2 \ldots d\xi_m$$

Thus, in order to find the distribution probability function of the new random variable $\xi_z$, given the distribution functions of the random variables $\xi_j$'s, one needs to define the range of the validity of the new variable z and to evaluate the integral using the mutual density function.

For the case of independent random variables, the above expression simplifies with the integrand replaced by $$\prod_{j=1}^{m} f_{\xi_j}.$$

Finally:

$$F_Z(z) = \int_{D_2}\int \prod_{j=1}^{m} f_{\xi_j} d\xi_1 d\xi_2 \ldots d\xi_N = \int_{D_2}\int \left[\prod_{j=1}^{m} S_j^m f_j(\xi)\right] d\xi^{(m)} \qquad (3)$$

Since the density function is the same for all individual elements of the multiplication term under the integral, expression (3) can symbolically be written as:

$$F_{n_i}^{(m)} = \int_{D_2} \int \left\{ \prod_{j=1}^{m} S_j^m f(\xi) \right\} d\xi^{(m)}, \qquad (4)$$

wherein $F_{n_i}^{(m)}$ represents the probability distribution function of $$\frac{\partial^m V(n_i, \xi)}{\partial i^m}$$

that can be easily evaluated to derive the respective density function, recalling that the term $$\prod_{j=1}^{m} S_j^m f(\xi)$$

really represents a convolution of the original probability function weighted accordingly.

The following discussion is focused on the case where the probability density function of the noise statistics is Gaussian. For the Gaussian case, the analysis yields a relatively straightforward expression as the Gaussian pdf belongs to the few probability functions that convolve into similar functions. A Gaussian distribution is therefore considered, where ξ is referred to as the random variable, $N(0, \sigma_0^2)$, i.e. a Gaussian distribution with the first moment equals zero, and the variance is given by $\sigma_0^2$ as an illustrative probability (the derivation of the following with mean values other than zero is straightforward).

For the above, it can be found that the following expression (5) explicitly describes the resultant statistics, wherein β(m) is the sum of the squares of the elements of the m+1's row in the Stochastic-Derivative matrix given above, and α(m) is the inverse of the square-root of the sum of the squares of the elements of the m+1's row of the Stochastic-Derivative matrix given above.

$$\frac{d^m N(0, \sigma_0^2)}{d i^m} = \alpha(m) N(0, \beta(m)\sigma_0^2) \qquad (5)$$

Note that for a normal distribution function, as used above, the condition $\alpha \propto 1/\sqrt{\beta}$ is required by the normalization condition.

Using equation (5) and the arguments above, the probability density function of a zero mean normal distribution for the exemplary cases of the first (equation 6), second (equation 7), and fifth (equation 8) derivatives respectively can be derived to be as follows:

$$\frac{d N(a, \sigma_0^2)}{d i} = \frac{1}{\sqrt{1^2 + 1^2}} N\left(0, \left(\sqrt{2}\,\sigma_0\right)^2\right) = \frac{1}{\sqrt{2}} N\left(0, \left(\sqrt{2}\,\sigma_0\right)^2\right) \qquad (6)$$

$$\frac{d^2 N(0, \sigma_0^2)}{d i^2} = \qquad (7)$$
$$\frac{1}{\sqrt{1^2 + 2^2 + 1^2}} N\left(0, \left[\left(\sqrt{2^2 + 1^2 + 1^2}\right)\sigma_0\right]^2\right) = \frac{1}{\sqrt{6}} N\left(0, \left(\sqrt{6}\,\sigma_0\right)^2\right)$$

$$\frac{d^5 N(0, \sigma_0^2)}{d i^5} = \frac{1}{\sqrt{1^2 + 5^2 + 10^2 + 10^2 + 5^2 + 1^2}} N\left(0, \left(\sqrt{252}\,\sigma_0\right)^2\right) = \qquad (8)$$
$$\frac{1}{\sqrt{252}} N\left(0, \left(\sqrt{252}\,\sigma_0\right)^2\right)$$

Figure 7:
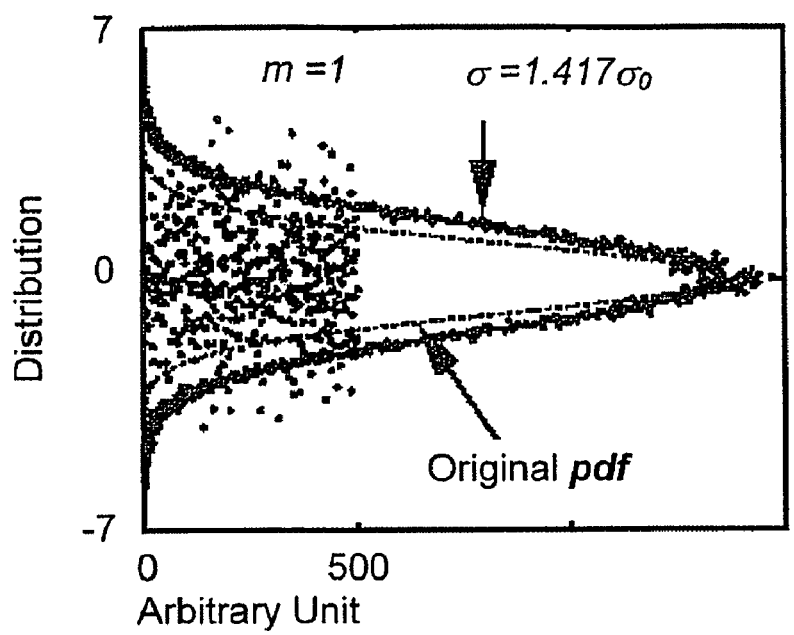
FIG. 7 illustrates a simulation of the first derivative (m=1) of a 200K normal distributed, N(0, $\sigma_0^2$=1), noise signal (only partially shown) with the corresponding deduced histogram (fitted to a Gaussian and arbitrarily scaled). Also shown is the original density function used to generate the noise signal (dashed curve). As expected, $\sigma=\sqrt{2}\sigma_0$.
Figure 8:
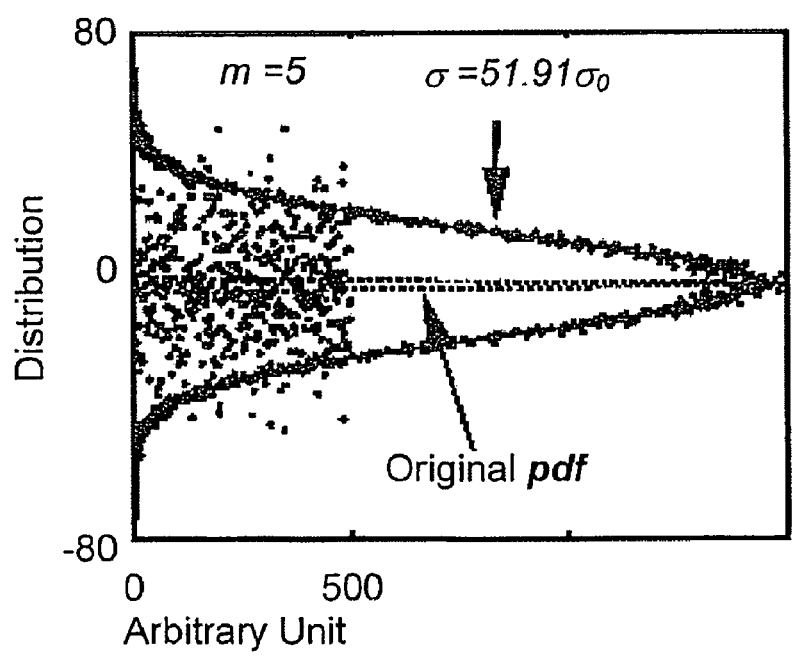
FIG. 8 illustrates a simulation of the Fifth derivative (m=5) of a normal distributed, noise signal (see also FIG. 7). As expected, $\sigma=\sqrt{252}\sigma_0$.

This was indeed verified by numerical simulations where a normal distributed random set of 200K elements was generated (FIGS. 7 and 8), where FIG. 7 illustrates a simulation of the first derivative (m=1) of a 200K normal distributed, N(0, $\sigma_0^2$=1), noise signal (only partially shown) with the corresponding deduced histogram (fitted to a Gaussian and arbitrarily scaled). Also shown is the original density function used to generate the noise signal. As expected, $\sigma = \sqrt{2}\sigma_0$. Additionally, FIG. 8 illustrates a simulation of the Fifth derivative (m=5) of a normal distributed, noise signal (see also FIG. 7). As expected, $\sigma = \sqrt{252}\sigma_0$.

In relation to the above, it should be clear that the histograms of the resultant vectors were then taken and are shown to have Gaussian shapes with variance values compatible with the above results.

Following the above theoretical considerations, it can obviously be concluded that expressions (3) and (4) can be used in the transformation step 7 above, while the simplified expression (5) can be used when the distribution is Gaussian.

To demonstrate one of the proposed motivations for the use of a high-order numerical derivative of a stochastic signal, we now refer to the derivation of the noise-level of an experimental output, where noise, either due to experimental set-up or due to the process itself (or due to both), is added to the signal. It is the aim of the following to demonstrate how to extract a simulated noise component such that the simulated noise is statistically identical to the noise part in the original experimental signal.

For simplicity we assume that the arbitrary noisy, raw signal can be represented by an arbitrary smooth and continuous signal contaminated by noise wherein S=P+N, N being the noise that is added to the pure signal P. Let us further assume that within the interval of validity of P, one can approximate P (for instance, in the Least Mean Square sense) by an m-degree polynomial function that may belong to a complete orthogonal polynomial basis. This can be proven to be possible for any bounded, smoothed and continuous function P (see for example the classical proof by K. Weierstrass, *Mathematische Werke*, Bd. III, Berlin 1903, pp. 1-17, and can also be found in most textbooks on Functional Analysis), but may be of practical use only when the interval is not too long, as compared to the structure of the signal, and for a relatively low polynomial degree.

Assuming the above, it turns out that $$\frac{d^{m+1} S}{d k^{m+1}} = \frac{d^{m+1} N}{d k^{m+1}},$$

as the m'th derivative of P, under the above assumptions, is constant and thus vanishes for higher orders. For most experimental data, m would not exceed 5 (see the above example). However the present approach holds for any arbitrarily higher order.

Now, if the characteristics of the statistical properties of the high-order derivative of the original noise $$\frac{\partial^{m+1}}{\partial i^{m+1}}(N)$$

is known, i.e. the probability density function that statistically describes the initial noise subject to high-order numerical derivative, in terms of the parameters (assumed to be unknown) of the statistical nature of the noise (assumed to be known), one can obtain the specific parameters of the original noise and thus deduce the noise-level in the original signal S.

Figure 6:
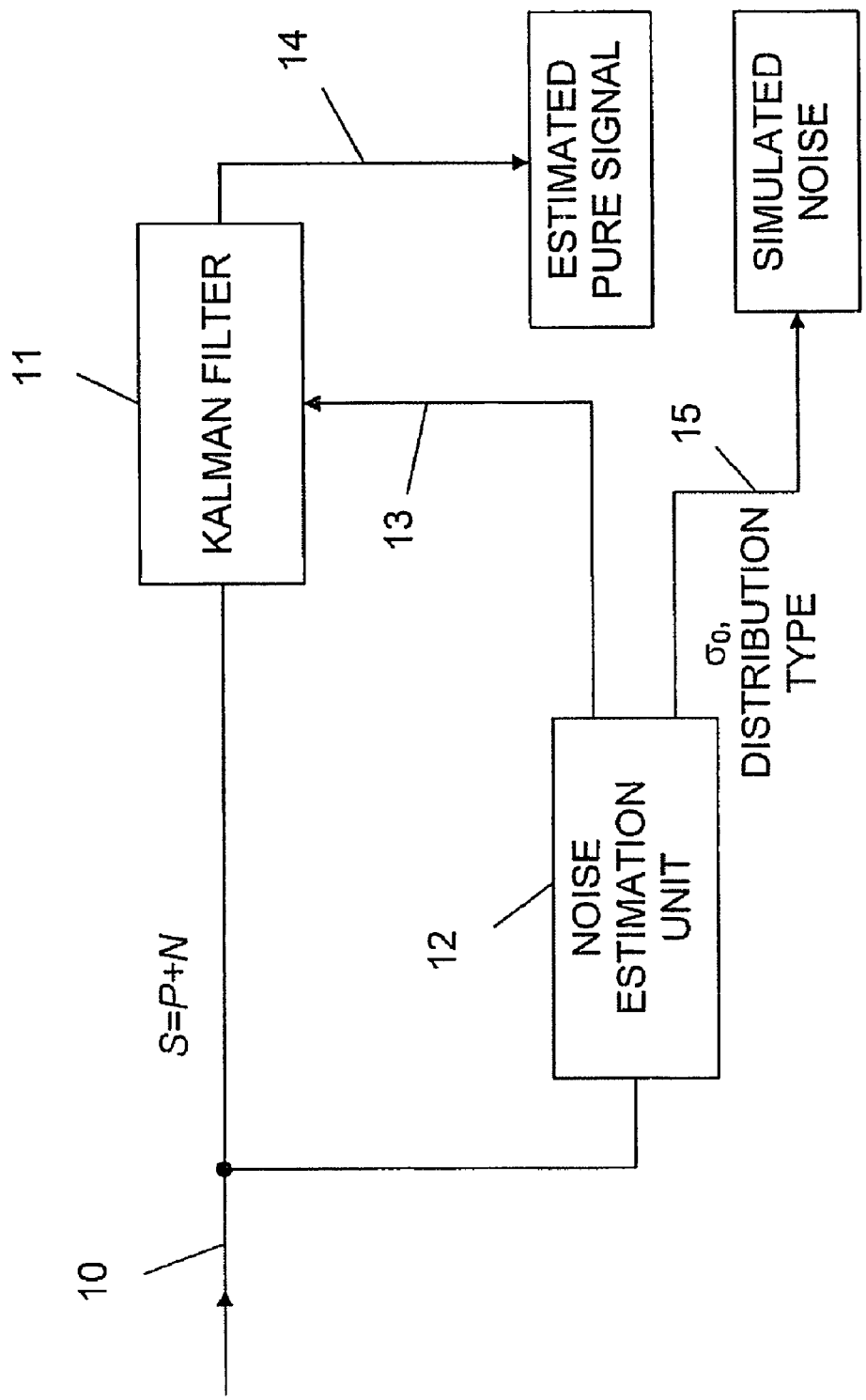
FIG. 6 illustrates how the method of the present invention can be used in conjunction with a Kalman filter.

FIG. 6 illustrates how the method of the present invention can be used in conjunction with a Kalman (or Extended Kalman) filter. The Kalman filter 11 receives at its input the raw signal S, which, as said, is a combination of a pure signal P and of the noise component N. For a linear system, when the distribution of the noise is Gaussian, and given the variance $\sigma^2_{(O)}$ of the noise distribution, a Kalman filter can provide at its output a best estimation (optimal) of the pure signal P. In the system of FIG. 6, the raw signal S is provided in parallel to both the Kalman filter 11 and to the input of the Noise Estimation Unit 12, which operates according to the method of the present invention, or more particularly, according to the method as disclosed in steps 1-7 above. The Noise Estimation Unit therefore analyzes the raw signal S according to the method of the invention, and provides in real-time to the Kalman filter over line 13 the variance $\sigma^2_{(O)}$ of the noise component N. The variance $\sigma^2_{(O)}$ of the noise component is one of the few parameters of the initial information that the Kalman filter requires in order to output the estimated pure signal P over line 14. Moreover, the Noise Estimation Unit can output over line 15 both the type of the probability density function, and the value of the variance $\sigma^2_{(O)}$ to any other component that may require, or use this data.

It should be noted that the exemplary system of FIG. 6 can operate essentially with most types of filters. In that case, another type of filter replaces the Kalman filter 11 of FIG. 6. This feature can be obtained in view of the fact that the Noise Estimation Unit 12 of the present invention can operate essentially with most types of probability density functions, and moreover, the unknown type of the probability density function, as well as its variance $\sigma^2_{(O)}$ can be determined and outputted by the Noise Estimation Unit 12 of the present invention.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method for an apparatus to determine the probability density function type and the variance properties of the noise component N of a raw signal S of a machine or a system, said raw signal S being combined of a pure signal component P and said noise component N, the method comprising:
   a. defining a window within said raw signal;
   b. recording the raw signal S;
   c. numerically differentiating the raw signal S within the range of said window at least a number of times m to obtain an m order differentiated signal;
   d. finding a histogram that best fits the m order differentiated signal;
   e. finding a probability density function type that fits the distribution of the histogram;
   f. determining the variance of the histogram, said histogram variance being essentially the m order variance $\sigma^2_{(m)}$ of the noise component N;
   g. knowing the histogram distribution type, and the m order variance $\sigma^2_{(m)}$ of the histogram, transforming the m order variance $\sigma^2_{(m)}$ to the zero order variance $\sigma^2_{(O)}$, said $\sigma^2_{(O)}$ being the variance of the probability density function of the noise component N, and wherein the histogram type as found in step (e) being the probability density function type of the noise component N; and
   h. the apparatus outputting at least one of the zero order variance $\sigma^2_{(O)}$ or the probability density function type.

2. The method according to claim 1, which is repeatedly performed as the raw signal S progresses.

3. The method according to claim 2 which is performed in real-time.

4. The method according to claim 3, wherein the one probability density function type is the Gaussian type.

5. The method according to claim 1, wherein the probability density function type that fits the distribution of the histogram is the one from a list that found to be best fitting the distribution of the histogram.

6. The method according to claim 5, wherein the list comprises only one probability density function type.

7. The method according to claim 1, wherein the transform is performed by means of a specific expression suitable for the said fitted probability density function, wherein said specific expression is derived from the following general expression $$F^{(m)}_{n_i} = \int_{D_S} \int \left\{ \prod_{j=1}^{m} S_j^m f(\xi) \right\} d\xi^{(m)}.$$

8. The method according to claim 1, wherein when the fitted probability distribution function is Gaussian, the transform is performed by means of the following specific expression $$\frac{d^m N(0, \sigma_0^2)}{d i^m} = \alpha(m) N(0, \beta(m) \sigma_0^2).$$

9. An apparatus for determining the probability density function type and the variance properties of the noise component N of a raw signal S of a machine or a system, said raw signal S being combined of a pure signal component P and said noise component N, the apparatus comprising:
   a. a differentiating module, for receiving and numerically differentiating the raw signal S within the range of a predefined window at least a number of times m to obtain an m order differentiated signal;
   b. a module for finding a histogram that best fits the m order differentiated signal;
   c. a list containing at least one type of predefined probability density function;
   d. a module for finding one probability density function type from said list that best fits the distribution of the histogram;

e. a module for determining the variance of the histogram, said histogram variance being essentially the m order variance $\sigma_{(m)}$ of the noise component N; and f. a module for, given the histogram distribution type and them m order variance $\sigma^2_{(m)}$ of the histogram, transforming the m order variance $\sigma^2_{(m)}$ to the zero order variance $\sigma^2_{(0)}$, said $\sigma^2_{(0)}$ being the variance of the probability density function of the noise component N, wherein the histogram type as found in step (d) being the probability density function type of the noise component N.

10. The apparatus according to claim 9, wherein the apparatus components operate repeatedly to find the updated probability density function type, and the variance properties of the noise component as the signal S progresses.

11. A system for receiving a raw signal S which is combined from a pure signal P and a noise component N, and for outputting a signal which is essentially said pure signal, comprising:

a. an apparatus according to claim 9 for receiving said raw signal and outputting the probability density function and distribution type of said noise component into a filter; and b. a filter receiving said raw signal and also receiving said probability density function and distribution type of said noise component from said apparatus, and given said received data, processing and outputting a signal which is essentially said pure signal.

12. The system according to claim 11, wherein the filter is an adaptive filter.

13. The system according to claim 12, wherein the filter is a Kalman Filter.

14. The system according to claim 11, for operating continuously in real time.

\* \* \* \* \*

UNITED STATES PATENT AND TRADEMARK OFFICE
CERTIFICATE OF CORRECTION

PATENT NO. : 7,552,154 B2  Page 1 of 1
APPLICATION NO. : 11/109061
DATED : June 23, 2009
INVENTOR(S) : Netzer Moriya It is certified that error appears in the above-identified patent and that said Letters Patent is hereby corrected as shown below:

| Column, Line | Reads | Should Read |
|---|---|---|
| 13, 5 | "them m order variance" | the m order variance |

Signed and Sealed this

Eighth Day of September, 2009

David J. Kappos
*Director of the United States Patent and Trademark Office*